United States Patent
Denninger et al.

(10) Patent No.: US 10,106,015 B2
(45) Date of Patent: Oct. 23, 2018

(54) AIR FILTER FOR A VENTILATION DEVICE OF A MOTOR VEHICLE AND METHOD FOR THE INSTALLATION THEREOF

(71) Applicant: Daimler AG, Stuttgart (DE)

(72) Inventors: Sabrina Denninger, Asperg (DE);
Wolfgang Enderle, Hochdorf (DE);
Negar Parvaresh, Stuttgart (DE)

(73) Assignee: Daimler AG, Stuttgart (DE)

(*) Notice: Subject to any disclaimer, the term of this patent is extended or adjusted under 35 U.S.C. 154(b) by 62 days.

(21) Appl. No.: 15/023,312

(22) PCT Filed: Aug. 2, 2014

(86) PCT No.: PCT/EP2014/002138
§ 371 (c)(1),
(2) Date: Mar. 18, 2016

(87) PCT Pub. No.: WO2015/039717
PCT Pub. Date: Mar. 26, 2015

(65) Prior Publication Data
US 2016/0243923 A1    Aug. 25, 2016

(30) Foreign Application Priority Data
Sep. 19, 2013  (DE) .................. 10 2013 015 630

(51) Int. Cl.
*B01D 46/00*    (2006.01)
*B60H 3/06*    (2006.01)
(Continued)

(52) U.S. Cl.
CPC ....... *B60H 3/0608* (2013.01); *B01D 46/0002* (2013.01); *B01D 46/0006* (2013.01);
(Continued)

(58) Field of Classification Search
CPC .... B01D 46/52; B01D 46/521; B60H 3/0658; B60H 2003/065; F24F 3/1603
(Continued)

(56) References Cited

U.S. PATENT DOCUMENTS 3,933,452 A  *  1/1976  Rudin ................... B01D 46/10
                                                    210/493.1
5,100,496 A  *  3/1992  Mitchell ................. B31C 1/00
                                                    156/209
(Continued)

FOREIGN PATENT DOCUMENTS

DE    10 2005 048 841 B3    7/2007
DE    10 2012 001 575 A1   12/2012
(Continued)

OTHER PUBLICATIONS

Japanese Office Action issued in Japanese counterpart application No. 2016-543329 dated Jan. 24, 2017, with partial English translation (Thirteen (13) pages).
(Continued)

*Primary Examiner* — Duane Smith
*Assistant Examiner* — Minh-Chau Pham
(74) *Attorney, Agent, or Firm* — Crowell & Moring LLP

(57) ABSTRACT

An air filter for a ventilation device of a motor vehicle is disclosed. The air filter has a frame element holding a filter element which can be connected to a receiving shaft of the ventilation device by at least one plug opening to form a plug connection with a guiding element. The frame element has at least one preparation for the production of the plug opening. A method for the installation of such an air filter is also disclosed.

8 Claims, 1 Drawing Sheet

(51) Int. Cl.
B01D 46/10 (2006.01)
B01D 46/52 (2006.01)

(52) U.S. Cl.
CPC ........... B01D 46/10 (2013.01); B01D 46/521 (2013.01); *B60H 2003/065* (2013.01)

(58) Field of Classification Search
USPC ..... 55/385.3, 494–497, 501, 521; 123/198 E
See application file for complete search history.

(56) References Cited

U.S. PATENT DOCUMENTS

| | | | | |
|---|---|---|---|---|
| 5,509,950 | A * | 4/1996 | van de Graaf | B01D 46/0005 55/486 |
| 5,809,800 | A * | 9/1998 | Deal | F24F 1/58 55/500 |
| 6,387,143 | B1 * | 5/2002 | Adiletta | B01D 46/10 55/497 |
| 6,454,826 | B2 * | 9/2002 | Fath | B01D 46/10 55/490 |
| 7,901,476 | B2 * | 3/2011 | Kao | B01D 46/0002 210/479 |
| 9,126,131 | B2 | 9/2015 | Arold | |
| 2005/0050869 | A1 * | 3/2005 | Haes | B01D 39/12 55/497 |
| 2007/0119132 | A1 * | 5/2007 | Ikeno | B01D 46/0005 55/492 |
| 2008/0236121 | A1 * | 10/2008 | Volkmer | B01D 46/0005 55/497 |
| 2009/0298413 | A1 * | 12/2009 | Arold | B01D 46/0005 454/158 |
| 2012/0324851 | A1 * | 12/2012 | Haefner | B60H 3/0658 55/521 |

FOREIGN PATENT DOCUMENTS

| | | |
|---|---|---|
| DE | 10 2012 005 188 A1 | 12/2012 |
| JP | 2009-511332 A | 3/2009 |
| WO | WO 2011/047755 A1 | 4/2011 |

OTHER PUBLICATIONS

PCT/EP2014/002138, International Search Report (PCT/ISA/220 and PCT/ISA/210) dated Nov. 19, 2014, with partial English translation, enclosing Written Opinion of the International Searching Authority (PCT/ISA/237) (Twelve (12) pages).

* cited by examiner

AIR FILTER FOR A VENTILATION DEVICE OF A MOTOR VEHICLE AND METHOD FOR THE INSTALLATION THEREOF

BACKGROUND AND SUMMARY OF THE INVENTION

The invention relates to an air filter for a ventilation device of a motor vehicle. The invention furthermore relates to a method for the installation of such an air filter.

Such an air filter for a ventilation device of a motor vehicle, for example an air conditioning or heating unit, is already known from DE 10 2005 048 841 B3, the air filter comprising a frame element holding a filter element. This frame element, which surrounds the filter element on the outer circumference, has two plug openings, via which the frame element or the whole air filter can be connected to a receiving shaft of the ventilation device to form respective plug connections with respective bolt-like guiding elements.

Until now, a different air filter with specifically formed and arranged or spaced apart plug openings has been used for each ventilation device. Furthermore, if an air filter, for example, which has corresponding plug openings, is used in a ventilation device not provided for this purpose and as a result no plug connection is produced with the respective plug openings of the air filter, an amount of leakage air can pass through via the respective plug openings. This means that unfiltered air sucked in from outside can pass through the air filter into the vehicle interior which can lead to a loss of comfort for the vehicle passengers.

The object of the present invention is therefore to create an air filter as well as a method for the installation of such an air filter, by means of which the air filter can be used in different variants of ventilation devices.

This object is solved according to the invention by an air filter as well as a method for the installation of such an air filter. Advantageous embodiments with expedient and significant developments of the invention are specified in the dependent claims.

In order to create an air filter of the abovementioned type, which can be used in different variants of ventilation devices, it is provided according to the invention that the frame element of the air filter has at least one preparation for the production of the plug opening. In other words, the frame element of the air filter according to the invention firstly has no plug opening, but rather only one respective preparation, in the region of which the respective plug opening is introduced as required or depending on the respective variant of the ventilation device. Since there are no unused plug openings as a result, no amount of leakage air can flow through to the vehicle interior, for example, which could lead to loss of comfort for the vehicle passengers. In fact, the air filter can either be installed completely without plug openings or rather only with such plug openings which are introduced in line with demand, depending on the respective variant of the ventilation device before installation in the region of the respective preparations.

A plurality of possibilities is thereby conceivable for the preparation.

A first embodiment of the invention provides that the preparation for the respective plug opening comprises a marking of a material region of the frame element to be removed. The marking can thereby be a color and/or material application to the respective frame element in particular. A fitter, for example, can therefore provide the frame element in the region of the marking or the preparation with a corresponding plug opening in a simple manner, in which the correspondingly marked material region of the frame element is removed.

Alternatively or in addition to the marking, the preparation for the plug opening can also be formed by a material weakening of a material region of the frame element to be removed. In this case, it would be conceivable, in particular, to form the preparation or the material region to be removed by a perforation, a circumferential groove or indentation, or rather by an overall material weakening, such that, if necessary, the respective plug opening can be created in a simple manner, for example by breaking out, punching out or cutting out.

In this respect, it has been shown to be advantageous, in particular, if a handle in the material region of the frame element to be removed, for example a tab, a grip or a nipple are provided on the material region to be removed. The material region to be removed can therefore be removed in a simple manner by pulling, pushing or similar on the handle.

Alternatively or in addition to the marking or the material weakening, the preparation for the plug opening can also comprise an attachment for a tool to remove the material region. In this case, it is conceivable, for example, to provide a centring for a drill or a different attachment which is optionally marked by a color and/or material application and can furthermore optionally also a have material weakening in order to achieve a simple removal of the corresponding material region by using tools.

In a further advantageous embodiment of the invention, a plurality of preparations is thereby provided in order to create respective plug openings. A preferred embodiment thereby provides that a plurality of variant-specific preparations is provided, wherein respective material regions of the frame element to be removed can be removed depending on the variant of the ventilation device. In other words, several preparations are therefore provided according to the invention, of which only those material regions in which the corresponding plug opening is used, are removed. The other preparations therefore remain unaffected or no plug openings are introduced such that no leakage air can pass via this into the vehicle interior. If necessary, it is thereby also conceivable to leave all preparations unused or to not introduce any plug openings into the frame element such that, in the case of a ventilation device which does not have any guiding elements on the side of the receiving shaft, the air filter can also be used.

As a result, it is thus recognizable that an air filter is created according to the invention which can be used in different variants of ventilation devices, which each have different bolt-like guiding elements or do not have any guiding elements at all.

The advantages referred to above in connection with the air filter according to the invention therefore apply in the same way for the method.

Further advantages, features and details of the invention arise from the following description of a preferred exemplary embodiment as well as with the aid of the drawings.

DETAILED DESCRIPTION OF THE DRAWINGS

Figure 1:
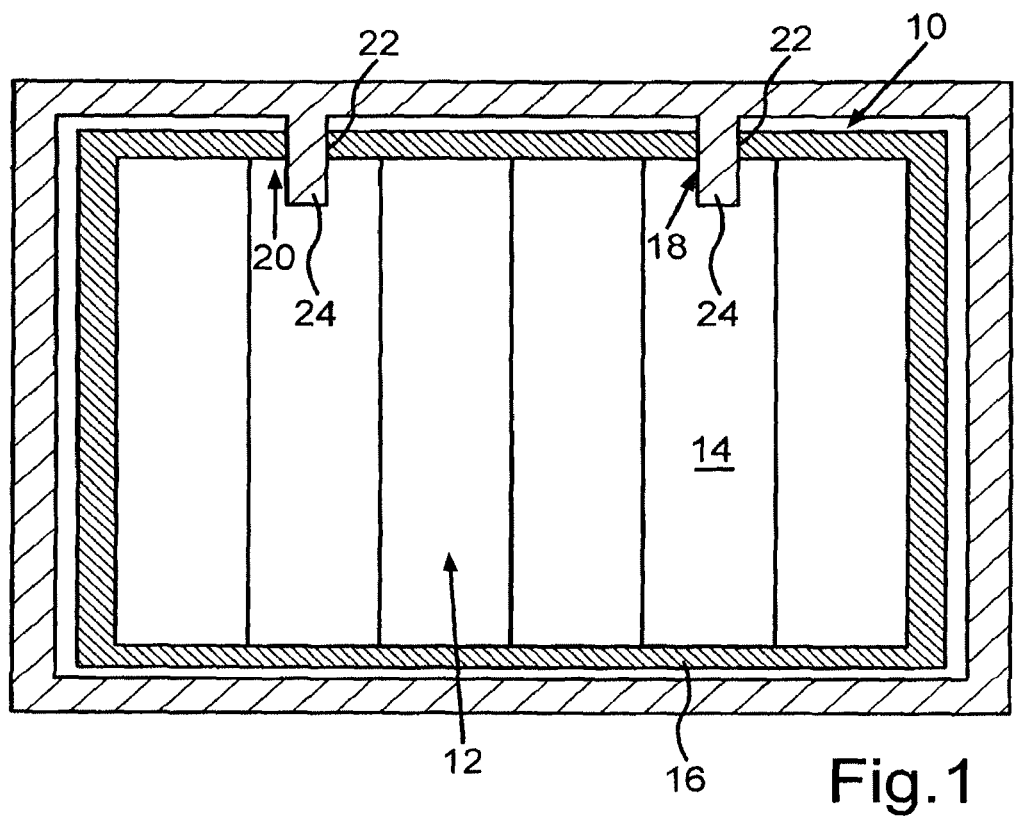
FIG. 1 is a schematic top view of a sectional representation of the receiving shaft of a ventilation device of a heating and/or air conditioning unit of a motor vehicle into which an air filter is inserted which comprises a frame element holding a filter element which is connected to the receiving shaft by means of two plug openings to form a plug connection with a respective guiding element.

In FIG. 1, a receiving shaft 10 of a ventilation device of a heating and/or air conditioning unit of a motor vehicle is represented in a schematic sectional view. The receiving shaft 10 is generally part of a so-called air conditioning box which comprises openings for fresh air on one side, which is sucked in from outside the motor vehicle, and an outlet opening on the other side for the further transportation of the filtered air in the direction of the vehicle interior.

In the present case, an air filter 12 is inserted into the receiving shaft 10, the air filter 12 being sealed off from the receiving shaft 10, for example, by means of a seal which is not depicted.

Figure 2:
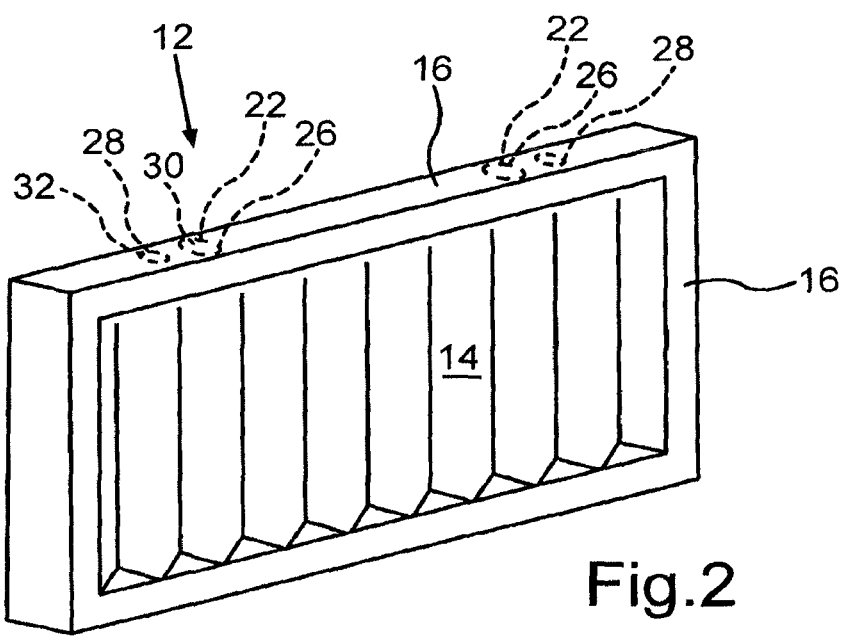
FIG. 2 is a perspective view of the separately represented air filter, where a plurality of preparations on the frame element for the production of the respective plug opening are recognizable, where respective material regions of the frame element to be removed can be removed depending on the variant of the ventilation device in the region of the respective variant-specific preparation.

This air filter 12 is indicated schematically in a separate perspective view in FIG. 2. As substantial components, the air filter 12 comprises a filter element 14 which is stretched or held in a frame element 16 which is formed circumferentially in the present case. It should thereby be considered in the scope of the invention that the frame element 16 must not necessarily be formed circumferentially around the filter element 14. Only a partial extension of the filter element 14 is enough, if necessary.

As is now recognizable from FIG. 1, the air filter 12 is inserted into the receiving shaft 10 in such a way that two plug connections 18, 20 are formed between the air filter 12 and the receiving shaft 10. More precisely, two plug openings 22 are introduced for this purpose into the frame element 16 on sides of the air filter 12, into which a respective guiding element 24 in the shape of a bolt, which is formed in the present case in one piece with the receiving shaft 10, is inserted to form the respective plug connection 18, 20. The respective guiding element 24 thereby serves for the installation of the air filter 12 as a guide to achieve an exact positioning of the air filter 12 and then to mount or fix the air filter 12 in a defined position. In this case, the respective plug openings 22 are presently connected to the corresponding guiding elements 24 with slight play. Alternatively, other common types of plug connections are conceivable.

As is now recognizable from FIG. 2, the air filter 12 has respective preparations 26, 28 in the region of the frame element 16 in its uninstalled, original or delivered form, in the region of which the respective plug opening 22 can be produced. As a result, the air filter 12 firstly does not yet have the plug openings 22, but only the preparations 26, 28 in the region of which the plug openings 22 can be introduced by a person installing the air filter 12.

The preparations 26, 28 can thereby comprise a respective marking of a material region of the frame element 16 to be removed, for example. A color and/or material application to the frame element 16 is, for example, conceivable beneath this, which corresponds to, for example, the shape of the plug opening 22 in terms of its geometry. As a result, it would be conceivable, for example, to provide a corresponding colored dot or a colored elevation on the frame element 16 which marks the later plug opening 22 or the material region of the frame element 16 to be removed.

The respective plug opening 26, 28 can, alternatively or in addition to the marking, also be formed by a material weakening of a material region of the frame element 16 to be removed. It would therefore be conceivable to provide a corresponding perforation, a (circumferential) groove or indentation, or rather a flat or, for example, circular material tapering in the frame element 16 which delimits or defines the material region to be removed. In this case, annular perforations, indentations or grooves would be conceivable, for example, in order to leave out a circular material region from the frame element 16.

It can thereby also be provided, in particular, that a handle such as, for example, a tab, a grip or a nipple are provided in the region of the material to be removed, i.e., in the material region of the frame element 16 to be removed, such that the corresponding material region to be removed can be removed with a simple pull or push.

Alternatively or in addition to both marking and material weakening, an attachment for a tool can also be provided as a preparation 26, 28 for the respective plug opening 22 for the removal of the material region of the frame element 16. As such, it is conceivable, for example, to provide a centring or similar as a preparation in the frame element 16 such that, for example by means of a drill, the respective plug opening 22 can be introduced in a simple manner. The attachment can thereby additionally be provided with a corresponding marking or rather also with a material weakening such that a simple removal of the respective material region for the production of the plug opening 22 is possible by means of the tool.

As is recognizable with the aid of FIG. 2, two circular preparations 26 are provided in the present case which respectively delimit a material region 30 to be removed which can be removed in the manner described above for the production of the respective plug opening 22. If this respective material region 30 is removed, the respective plug connection 18, 20 shown in FIG. 1 can be generated.

Alternatively to this, further preparations 28 are provided in the frame element 16 of the air filter 12 shown in FIG. 2, the preparations 28 being formed in the present case, for example, with a rectangular shape. If the air filter 12 is used, for example, in other ventilation devices, variant-specifically, the respective material regions 32 of the preparations 28 can be removed rather than the material regions 30 of the preparations 26. As a result, variant-specific preparations 26, 28 are created in the present case which make it possible to remove only those material regions 30 or 32 which are required for the respectively required plug connections 18, 20. The air filter 12 can therefore be used in different variants of ventilation devices, for example in different vehicle series. This has the advantage that material regions 30, 32 of respective preparations 26, 28 which are not used, are not removed and consequently remain closed. In other words, the respective plug openings 22 are only introduced in the region of the respective preparations 26, 28 which are used according to the variant of the ventilation device used. This has the advantage, in particular, that there are no plug openings 22 which are not used and via which leakage air could pass into the vehicle interior and that an air filter 12 is still created which can be used in different variants of the ventilation device, for example in different vehicle series.

Before the installation of the air filter 12 into the respective receiving shaft 10 of the corresponding ventilation device, the respective plug openings 22 are therefore generated by removing the respective material region 30, 32 of the corresponding preparation 26, 28 in the frame element 16, and then the corresponding plug opening 22 is connected to the corresponding guiding element 24 or attached onto this to form the respective plug connection 18, 20.

The present air filter 12 furthermore has the advantage that it can also be used if no plug connection 18, 20 is to be created and consequently no plug opening 22 is required. In this case, the present air filter 12 therefore has the advantage, on the other hand, that no plug openings 22 are present via which leakage air from outside the vehicle could get into the vehicle interior.

The invention claimed is:

1. An air filter of a ventilation device of a motor vehicle, comprising:
    a frame element; and
    a filter element disposed in the frame element, wherein the filter element is connectable to a receiving shaft of the ventilation device by a plug opening in the frame element;
    wherein the frame element includes a preparation for production of the plug opening, wherein the preparation comprises a material weakening of a material region of the frame element, and wherein the material region is removable to produce the plug opening.

2. The air filter according to claim 1, wherein the preparation further comprises a marking of the material region of the frame element.

3. The air filter according to claim 2, wherein the marking comprises a color and/or a material application to the frame element.

4. The air filter according to claim 1, wherein a handle is disposed in the material region of the frame element.

5. The air filter according to claim 1, wherein the preparation further comprises an attachment for a tool.

6. The air filter according to claim 1, wherein the frame element includes a second preparation.

7. The air filter according to claim 1, wherein the frame includes a plurality of preparations and wherein each of the plurality of preparations are associated with a variant of the ventilation device.

8. A method for installation of an air filter in a ventilation device of a motor vehicle, comprising the steps of:
    generating a plug opening in a frame element of the air filter, wherein the frame element holds a filter element, by removing a material region in the frame element, wherein the material region is delimited by a material weakening of the frame element; and
    after the generating, connecting the air filter to a receiving shaft of the ventilation device via the plug opening.

* * * * *